(12) United States Patent
Van Benthem

(10) Patent No.: US 11,416,215 B2
(45) Date of Patent: Aug. 16, 2022

(54) LOOK AHEAD NORMALISER

(71) Applicant: Imagination Technologies Limited, Kings Langley (GB)

(72) Inventor: Casper Van Benthem, Hertfordshire (GB)

(73) Assignee: Imagination Technologies Limited, Kings Langley (GB)

(*) Notice: Subject to any disclaimer, the term of this patent is extended or adjusted under 35 U.S.C. 154(b) by 0 days.

(21) Appl. No.: 17/189,137

(22) Filed: Mar. 1, 2021

(65) Prior Publication Data

US 2021/0279035 A1   Sep. 9, 2021

(30) Foreign Application Priority Data

Feb. 28, 2020 (GB) .................................. 2002883

(51) Int. Cl.
*G06F 5/01* (2006.01)
*G06F 7/499* (2006.01)

(52) U.S. Cl.
CPC ............ *G06F 5/01* (2013.01); *G06F 7/49936* (2013.01)

(58) Field of Classification Search
CPC .................. G06F 5/01–017; G06F 7/49936
See application file for complete search history.

(56) References Cited

U.S. PATENT DOCUMENTS

| | | | |
|---|---|---|---|
| 5,241,490 A | 8/1993 | Poon | |
| 5,392,228 A * | 2/1995 | Burgess | G06F 5/012 |
| | | | 708/205 |
| 5,633,819 A * | 5/1997 | Brashears | G06F 5/012 |
| | | | 708/205 |
| 6,405,232 B1 * | 6/2002 | Green | G06F 7/485 |
| | | | 712/222 |
| 9,703,525 B2 * | 7/2017 | Drane | G06F 5/01 |

(Continued)

OTHER PUBLICATIONS

Dimitrakopoulos et al., "Low-Power Leading-Zero Counting and Anticipation Logic for High-Speed Floating Point Units," IEEE Transactions on Very Large Scale Integration (VLSI) Systems, vol. 16 No. 7, 2008, pp. 837-850 p. 838, right-hand column, last paragraph—p. 839, left-hand column, paragraph 2.

(Continued)

*Primary Examiner* — Matthew D Sandifer
(74) *Attorney, Agent, or Firm* — Potomac Law Group, PLLC; Vincent M DeLuca

(57) ABSTRACT

Apparatus includes hardware logic arranged to normalise an n-bit input number. The hardware logic comprises at least a first hardware logic stage, an intermediate hardware logic stage and a final hardware logic stage. Each stage comprises a left shifting logic element, the first and intermediate stages each also comprise a plurality of OR-reduction logic elements and the intermediate and final stages each also comprise one or more multiplexers. The OR-reduction logic elements operate on different subsets of bits from the number input to the particular stage. In the intermediate and final hardware logic stages, a first of the multiplexers selects an OR-reduction result received from a previous hardware logic stage and the left shifting logic element is arranged to perform left shifting on the updated binary number received from an immediately previous hardware logic stage dependent upon the selected OR-reduction result.

14 Claims, 10 Drawing Sheets

(56) References Cited

U.S. PATENT DOCUMENTS

| | | | |
|---|---|---|---|
| 10,223,068 B2* | 3/2019 | Drane | G06F 5/01 |
| 10,698,655 B2* | 6/2020 | Drane | G06F 7/74 |
| 10,977,000 B2* | 4/2021 | Drane | G06F 7/74 |
| 2007/0050434 A1* | 3/2007 | Lutz | G06F 7/49936 |
| | | | 708/200 |
| 2017/0300297 A1 | 10/2017 | Drane | |

OTHER PUBLICATIONS

Oklobdzija, "Transactions Briefs an Algorithmic and Novel Design of a Leading Zero Detector Circuit: Comparison with Logic Synthesis," IEEE Transactions on Very Large Scale Integration (VLSI) Systems, 1994, URL: https://www.csee.umbc.edu/-phatak/645/supl/lza/vojin-lzadesign-tvlsi-94. pdf Section II.

* cited by examiner

LOOK AHEAD NORMALISER

BACKGROUND

Normalising an n-bit number (where n≥2) comprises left shifting the number so that the most significant (or leading) one is in the left most position (the most significant bit, MSB) and returning the leading zero count of the number, where 'leading zeros' are counted from the left, such that a binary number 1110 has no leading zero and a binary number 0001 has three leading zeros. There are many uses for normalising and in particular it is used in floating point arithmetic. In floating point units in processors, the operation of left shifting the significand (a number with a one in the MSB) by the exponent value is called denormalising and the subsequent operation to convert back to floating point (such that the leading one is in the MSB) is referred to as 'renormalisation'.

Normalisation (or renormalisation) is performed by performing a leading zero count and then left shifting the input n-bit number by this amount. For example, if the input number is 0001, the leading zero count would identify that there are 3 leading zeros and the subsequent left shifting operation would shift the leading one by 3 positions. The normaliser (or renormaliser) would therefore output the result 1000 and simultaneously the leading zero count of 3 (or 11 in binary).

The embodiments described below are not limited to implementations which solve any or all of the disadvantages of known normalisers and renormalisers.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Apparatus comprising hardware logic arranged to normalise an n-bit input number is described. The hardware logic comprises at least a first hardware logic stage, an intermediate hardware logic stage and a final hardware logic stage. Each stage comprises a left shifting logic element, the first and intermediate stages each also comprise a plurality of OR-reduction logic elements and the intermediate and final stages each also comprise one or more multiplexers. The OR-reduction logic elements operate on different subsets of bits from the number input to the particular stage. In the intermediate and final hardware logic stages, a first of the multiplexers selects an OR-reduction result received from a previous hardware logic stage and the left shifting logic element is arranged to perform left shifting on the updated binary number received from an immediately previous hardware logic stage dependent upon the selected OR-reduction result.

A first aspect provides an apparatus comprising hardware logic arranged to normalise an n-bit input number, the hardware logic comprising: a first hardware logic stage comprising a left shifting logic element and a plurality of OR-reduction logic elements, wherein each OR-reduction logic element is arranged to perform OR-reduction on a different subset of bits from the input number and the left shifting logic element is arranged to perform left shifting on the input number dependent upon a value output by a first of the OR-reduction logic elements and output an updated binary number; one or more intermediate hardware logic stages, each comprising a left shifting logic element, a plurality of OR-reduction logic elements and one or more multiplexers, wherein each OR-reduction logic element in an intermediate stage is arranged to perform OR-reduction on a different subset of bits from an updated binary number received from an immediately previous hardware logic stage, a first of the multiplexers is arranged to select one of a plurality of OR-reduction results received from a previous hardware logic stage and the left shifting logic element is arranged to perform left shifting on the updated binary number received from an immediately previous hardware logic stage dependent upon the selected OR-reduction result and output an updated binary number; and one or more final hardware logic stages, each comprising a left shifting logic element and one or more multiplexers, wherein a first of the multiplexers is arranged to select one of a plurality of OR-reduction results received from a previous hardware logic stage and the left shifting logic element is arranged to perform left shifting on the updated binary number received from an immediately previous hardware logic stage dependent upon the selected OR-reduction result and output an updated binary number and wherein, for a last of the final hardware logic stages, the updated binary number is the normalised input number.

A second aspect provides a method of normalising an n-bit input number, the method comprising: in a first hardware logic stage: in a plurality of OR-reducing operations, performing OR-reduction on a different subset of bits from the input number; left shifting the input number dependent upon a value output by a first of the OR-reducing operations to generate an updated binary number; and outputting the updated binary number to a next hardware logic stage; in one or more intermediate hardware logic stages: in a plurality of OR-reducing operations, performing OR-reduction on a different subset of bits from the updated binary number received from an immediately previous hardware logic stage; selecting one of a plurality of OR-reduction results received from a previous hardware logic stage; left shifting the updated binary number received from an immediately previous hardware logic stage dependent upon the selected OR-reduction result to generate an updated binary number; and outputting the updated binary number to a next hardware logic stage; and in one or more final hardware logic stages: selecting one of a plurality of OR-reduction results received from a previous hardware logic stage; left shifting the updated binary number received from an immediately previous hardware logic stage dependent upon the selected OR-reduction result to generate an updated binary number; and outputting the updated binary number, wherein, for a last of the final hardware logic stages, the updated binary number output by the hardware logic stage is the normalised input number.

A third aspect provides a computer readable storage medium having encoded thereon computer readable program code for generating a processor comprising hardware logic arranged to normalise an n-bit input number, the hardware logic comprising: a first hardware logic stage comprising a left shifting logic element and a plurality of OR-reduction logic elements, wherein each OR-reduction logic element is arranged to perform OR-reduction on a different subset of bits from the input number and the left shifting logic element is arranged to perform left shifting on the input number dependent upon a value output by a first of the OR-reduction logic elements and output an updated binary number; one or more intermediate hardware logic stages, each comprising a left shifting logic element, a plurality of OR-reduction logic elements and one or more multiplexers, wherein each OR-reduction logic element in an intermediate stage is arranged to perform OR-reduction on a different subset of bits from an updated binary number received from an immediately previous hardware logic stage, a first of the multiplexers is arranged to select one of a plurality of OR-reduction results received from a previous hardware logic stage and the left shifting logic element is arranged to perform left shifting on the updated binary number received from an immediately previous hardware logic stage dependent upon the selected OR-reduction result and output an updated binary number; and one or more final hardware logic stages, each comprising a left shifting logic element and one or more multiplexers, wherein a first of the multiplexers is arranged to select one of a plurality of OR-reduction results received from a previous hardware logic stage and the left shifting logic element is arranged to perform left shifting on the updated binary number received from an immediately previous hardware logic stage dependent upon the selected OR-reduction result and output an updated binary number and wherein, for a last of the final hardware logic stages, the updated binary number is the normalised input number.

The look ahead normaliser described herein may be embodied in hardware on an integrated circuit. There may be provided a method of manufacturing, at an integrated circuit manufacturing system, a look ahead normaliser. There may be provided an integrated circuit definition dataset that, when processed in an integrated circuit manufacturing system, configures the system to manufacture a look ahead normaliser. There may be provided a non-transitory computer readable storage medium having stored thereon a computer readable description of an integrated circuit that, when processed, causes a layout processing system to generate a circuit layout description used in an integrated circuit manufacturing system to manufacture a look ahead normaliser.

There may be provided an integrated circuit manufacturing system comprising: a non-transitory computer readable storage medium having stored thereon a computer readable integrated circuit description that describes the look ahead normaliser; a layout processing system configured to process the integrated circuit description so as to generate a circuit layout description of an integrated circuit embodying the look ahead normaliser; and an integrated circuit generation system configured to manufacture the look ahead normaliser according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
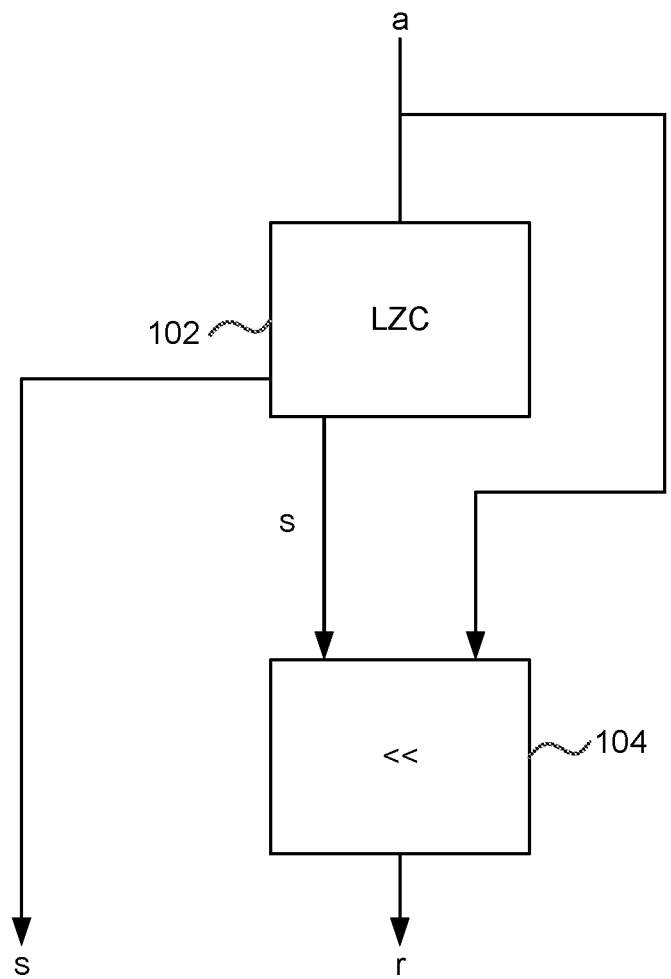
FIG. 1 is a schematic diagram of a known arrangement of hardware logic for performing normalisation.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

As described above, normalisation is usually performed by passing the input number, a, through a leading zero counter (LZC) 102 and then left shifting the input number a (in a left shifter 104) by the number, s, output by the LZC 102, as shown in FIG. 1. The normalised output is denoted r. Both values r and s are output by the normalisation operation. This normalisation process can be a relatively slow operation.

One way of performing normalisation uses a logarithmic architecture involving a series of stages. In each stage, OR-reduction is performed on a plurality of most significant bits (e.g. k MSBs) from the data output by the previous stage (or, for the first stage, the input number a) and then left shifting is performed dependent upon the result of the OR-reduction. If the output of the OR-reduction is a zero, the stage shifts the data left by the number of bits combined in the OR-reduction (e.g. by k bits) and the resultant data is output to the next stage. If the output of the OR-reduction is a one, no left shifting is performed and the data is output to the next stage unaltered. In successive stages (irrespective of the result of the OR-reduction in the previous stage), the OR-reduction combines a smaller number of MSBs (e.g. the value of k is reduced for each successive stage).

The term 'OR-reduction' is used herein to refer to an operation in which the input bits (i.e. the input bits to the OR-reduction operation) are combined together either through a tree of OR logic gates or an OR-logic element that has more than two inputs, such that the output of the operation is a one if any of the input bits are one (irrespective of how many are one and how many are zero) and the output is zero only if all of the input bits are zero.

In some applications, the normalisation operation may be referred to as a 'renormalisation' (e.g. within a floating point unit, following denormalisation). For the purposes of the following description the terms 'normalisation' and 'renormalisation' are considered to be equivalent and interchangeable and the methods and hardware logic described herein may be used in either normalisation or renormalisation.

The term 'subset' is used herein to refer to a proper subset.

Improved hardware logic for performing normalisation is described herein which comprises a series of hardware logic stages. In all except for the last few stages of the hardware logic, more than one OR-reduction operation is performed, with each OR-reduction operation being performed on a different subset of the bits input to that stage from a previous stage (or, for the first stage, the input number a). The number of bits, k, in each subset reduces for each successive stage of the hardware (i.e. the value of k used in the second stage is smaller than the value of k used in the first stage, the value of k used in the third stage is smaller than the value of k used in the second stage, etc.). Each stage performs a left shifting operation on the input bits dependent upon the result of an OR-reduction operation and based on this OR-reduction result, left shifts the input bits either by the value of k for the particular stage or by zero bits. With the exception of the first stage, the left shifting is performed dependent upon the result of an OR-reduction operation performed in a previous stage. Consequently, the hardware logic may be referred to as a 'look ahead normaliser' or 'look ahead renormaliser'. For the purposes of the following description, the term 'look ahead normaliser' will be used for consistency.

In a one-stage look ahead normaliser, the first stage of the normalisation hardware performs three separate OR-reduction operations, one on each of three different subsets of the input number and each subsequent stage, except for the last stage, performs two separate OR-reduction operations, one on each of two different subsets of the bits input to that stage. In the first stage, the left shifting that is performed is dependent upon the result of an OR-reduction operation performed in the first stage. In each subsequent stage, the left shifting that is performed is dependent upon the result of one of the OR-reduction operations performed in the immediately previous stage and the last stage does not perform any OR-reduction operations. The final OR-reduction operation (which is performed in the penultimate stage) selects one bit from the bits input to that stage.

In a two-stage look ahead normaliser, the first stage of the normalisation hardware may perform seven separate OR-reduction operations, one on each of seven different subsets of the input number and each subsequent stage, except for the last two stages, may perform four separate OR-reduction operations, one on each of four different subsets of the bits input to that stage. In the first stage, the left shifting that is performed is dependent upon the result of one of the OR-reduction operations performed in the first stage. In the second stage, the left shifting that is performed is dependent upon the result of another of the OR-reduction operations performed in the first stage. In each subsequent stage, the left shifting that is performed is dependent upon the result of one of the OR-reduction operations performed two-stages prior to the particular stage (i.e. in the stage before the immediately previous stage) and the last two stages do not perform any OR-reduction operations.

More generally, in an M-stage look ahead normaliser, the first stage of the normalisation hardware may perform $2^{M+1}-1$ separate OR-reduction operations, each on a different subset of the input number and each subsequent stage, except for the last M stages, may perform $2^M$ separate OR-reduction operations, one on each of $2^M$ different subsets of the bits input to that stage. In the first M stages, the left shifting that is performed is dependent upon the result of one of the OR-reduction operations performed in the first stage. In each subsequent stage (i.e. after the $M^{th}$ stage), the left shifting that is performed is dependent upon the result of one of the OR-reduction operations performed in a stage which is M stages prior to the particular stage (i.e. M-1 stages before the immediately previous stage) and the last M stages do not perform any OR-reduction operations.

Alternatively, a hybrid approach may be used, such that early stages in the look ahead normaliser operate as a one-stage look ahead normaliser and later stages operate as an M-stage look ahead normaliser with M>1 and in some cases with M increasing for later stages. This means that instead of performing $2^{M+1}-1$ $(=2^M+2^{M-1}+ \ldots +2^1+2^0)$ separate OR-reduction operations in the first stage, the number of OR-reduction stages in the first stage is lower (e.g. $2^1+2^0$ separate OR-reduction operations), and subsequent stages involve more OR-reduction stages (e.g. the second stage may perform $2^{M+1}-2$ OR-reduction operations). In all stages of such a look ahead normaliser, except for the first stage, the left shifting that is performed is dependent upon the result of one of the OR-reduction operations performed in a previous stage.

In all these look ahead normalisers, the left shifting that is performed is dependent upon the result of a selected OR-reduction operation and in all except the first stage, the selected OR-reduction operation was performed not in the particular stage but in a previous stage. In all cases, the result of the selected OR-reduction operation affects the left shifting as follows: if the output (or result) of the selected OR-reduction operation is a zero, the stage shifts the data left by the number of bits combined in the selected OR-reduction operation (where this number of bits will vary between stages) and if the output of the selected OR-reduction operation is a one, the stage shifts the data left by zero bits, i.e. no left shifting is performed. The number of bits input to and output from any stage is the same irrespective of whether left shifting is performed in any stage (and corresponds to the number of bits, n, in the original input number, a) and so where left shifting is performed by k bits, the part-normalised binary numbers (i.e. the binary numbers generated by the left shifting operation) are left-aligned with zeros populating k least significant bit (LSB) positions. For example, if an input binary number comprising 8 bits 00001011 is left shifted by four places (k=4), the output from the particular stage is 10110000 and it can be seen that the four LSBs are all zeros.

By using a look ahead normaliser as described herein (e.g. instead of the standard logarithmic approach), the critical path (and hence delay) is reduced because it is not necessary within a stage (except for the first stage) to wait for the OR-reduction in that stage to complete before the left shifting can be performed. This enables the OR-reduction and the left shifting to be performed at least partly in parallel within any stage of the hardware. Whilst there is a small increase in the number of OR-reduction logic elements (e.g. by about 25%), the overall reduction on critical path (and hence delay) may enable smaller implementations (e.g. because of the ability to use lower power levels, less buffering, etc.). The normalisation hardware described herein is also adaptable and does not require the setting of an internal parameter as is the case in some alternative hardware arrangements. Additionally, where the LZC output is critical to the operation of the system containing the normaliser hardware, the LZC may be output earlier than the normalised result.

Figure 2:
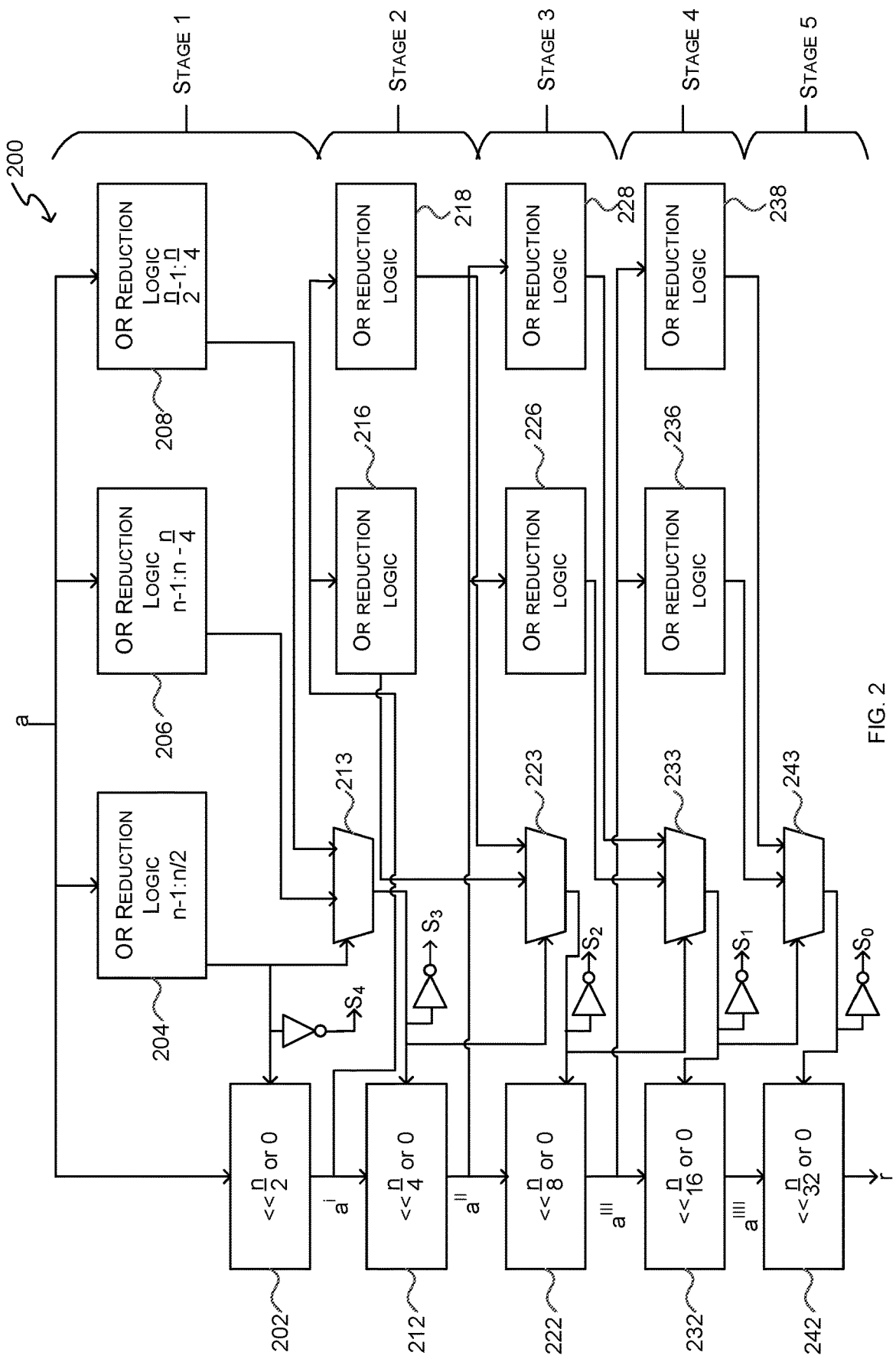
FIG. 2 is a schematic diagram showing an example one-stage look ahead renormaliser.
Figure 3A:
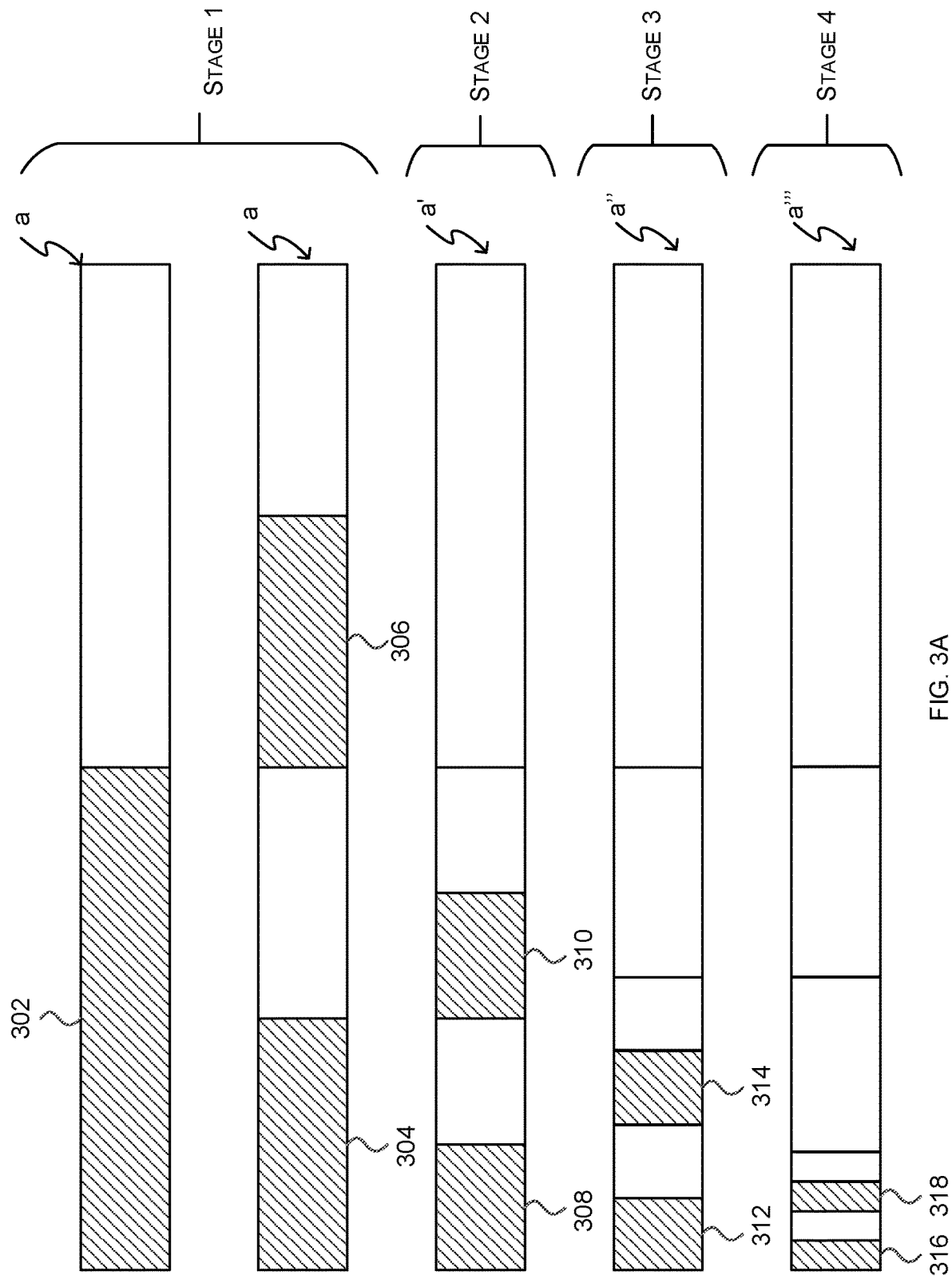
FIGS. 3A and 3B show graphically two examples of the operation of the hardware of FIG. 2.

FIG. 2 is a schematic diagram showing an example one-stage look ahead normaliser 200. As shown in FIG. 2, the first stage (stage 1) comprises a left shifting logic element 202 and three OR-reduction logic elements 204-208. The first of the OR-reduction logic elements 204 performs OR-reduction on the bits in the first half 302 of the input number, a, as shown in FIG. 3A. In an example where the input number comprises n bits, the first OR-reduction logic element 204 may perform OR-reduction on bits n−1:n/2, i.e. the half of the bits that comprises the MSB. It will be appreciated that whilst this normaliser architecture shown in FIG. 2 is described for examples where n is a power of two (and in particular, for FIG. 2, n=32) and where each successive stage halves the number of bits (e.g. k=n/2 for stage 1, k=n/4 for stage 2, k=n/8 for stage 3, etc. or more generally, for stage i, k=n/$2^i$), in other examples n may not be a power of two and/or the OR-reduction may be performed on a different proportion of the bits input to that stage (e.g. the first third of the bits).

The second and third of the OR-reduction logic elements 206, 208 perform OR-reduction on the bits in the first half of each half of the input number respectively (i.e. on the bits in the first and third quarters 304, 306 of the input number a, as shown in FIG. 3A). In an example where the input number comprises n bits, the second OR-reduction logic element 206 may perform OR-reduction on bits n−1:n−n/4 and the third OR-reduction logic element 208 may perform OR-reduction on bits n/2−1:n/4.

Dependent upon the result output by the first OR-reduction logic element 204 in the first stage, the left shifting logic element 202 in the first stage shifts the input number by either n/2 bits or by zero bits, i.e. if the output of the first OR-reduction logic element 204 is a zero, the left shifting logic element 202 shifts the data left by n/2 bits (i.e. the number of bits combined in the OR-reduction operation) and appends n/2 zeros and if the output of the first OR-reduction logic element 204 is a one, the left shifting logic element 202 shifts the data left by zero bits, i.e. no left shifting is performed.

The first stage outputs an updated binary number from the left shifting logic element 202 (where, as described above, this may be identical to the input number a, in the event that no left shifting was performed) and the results from the three OR-reduction logic elements 204-208. The results from the OR-reduction logic elements 204-208 are input to the second stage, along with the updated binary number, a', and the inverse of the result from the first OR-reduction logic element 204 may also be output as the MSB ($s_4$ in the example shown) of the LZC result, s.

The second stage (stage 2) in the normaliser 200 comprises a left shifting logic element 212, a multiplexer 213 and two OR-reduction logic elements 216, 218. The OR-reduction logic elements 206, 208 receive as an input, the updated binary number, a', output from the first stage (i.e. from the left shifting logic element 202 in the first stage) and perform OR-reduction on the bits in each of two portions of the first half of the updated binary number, i.e. on the first half of each of the first two quarters of the updated binary number, 308, 310, as shown in FIG. 3A. In an example where the input number comprises n bits, the first OR-reduction logic element 216 in the second stage may perform OR-reduction on bits n−1:n−n/8 and the second OR-reduction logic element 218 in the second stage may perform OR-reduction on bits n−n/4−1:n−3n/8. These two bit ranges may be written more generally, where i is the number of the stage (i.e. i=2 for the second stage, such that the first OR-reduction logic element in stage i (where i>1) performs OR-reduction on bits n−1:n−n/$2^{i+1}$ and the second OR-reduction logic element in stage i (where i>1) performs OR-reduction on bits n−n/$2^i$−1:n−3n/$2^{i+1}$.

The multiplexer 213 in the second stage receives as inputs the results from the second and third OR-reduction logic elements 206, 208 in the first stage and selects one of these two results based on the result from the first OR-reduction logic element 204 in the first stage, which is input to the multiplexer 213 as a control signal. In particular, if the output of the first OR-reduction logic element 204 in the first stage is a one, then the result from the second OR-reduction logic element 206 is selected and output to the left shifting logic element 212 in the second stage, whereas if the output of the first OR-reduction logic element 204 in the first stage is a zero, then the result from the third OR-reduction logic element 208 is selected and output to the left shifting logic element 212 in the second stage.

Dependent upon the OR-reduction result selected by the multiplexer 213, the left shifting logic element 212 in the second stage shifts the input number by either n/4 bits or by zero bits, i.e. if the selected OR-reduction result is a zero, the left shifting logic element 212 shifts the data left by n/4 bits (i.e. the number of bits combined in the OR-reduction operation that generated the result) and appends n/4 zeros and if the selected OR-reduction result is a one, the left shifting logic element 212 shifts the data left by zero bits, i.e. no left shifting is performed. As described above, in all cases, the updated binary number, a'', output by the left shifting logic element 212 comprises the same number of bits, n, as the input binary number, a.

The second stage outputs an updated binary number, a'', from the left shifting logic element 212 (where, as described above, this may be identical to the input number a, in the event that no left shifting was performed in either the first or second stages), the selected OR-reduction result from the first stage and the results from the two OR-reduction logic elements 216, 218 in the second stage. The selected OR-reduction result, the results from the two OR-reduction logic elements 216, 218 and the updated binary number are input to the third stage and the inverse of the selected OR-reduction result is output as the next most significant bit, $s_3$, of the LZC result, s.

The third and fourth stages (stages 3 and 4) operate in the same way as the second stage. Each stage comprises a left shifting logic element 222, 232, a multiplexer 223, 233, a first OR-reduction logic element 226, 236 and a second OR-reduction logic element 228, 238. The OR-reduction logic elements 226, 236, 228, 238 in the current stage receive as an input, the updated binary number output from the previous stage (i.e. from the left shifting logic element in the previous stage) and perform OR-reduction on two portions of bits from the updated binary number, where these two portions are defined as follows:

$$\text{First } OR\text{-reduction logic element in stage } i\text{: } n-1{:}n-\frac{n}{2^{i+1}}$$

$$\text{Second } OR\text{-reduction logic element in stage } i\text{: } n-\frac{n}{2^i}-1{:}n-\frac{3n}{2^{i+1}}$$

As shown in FIG. 3A, according to these formulae, in the third stage the OR-reduction logic elements 226, 228 perform OR-reduction on the bits in the first half of each of the first two eighths of the updated binary number a'', 312, 314 and in the fourth stage, the OR-reduction logic elements 236, 238 perform OR-reduction on the bits in the first half of each of the first two sixteenths of the updated binary number a''', 312, 314. More generally, in stage i (for stages where i>1), the OR-reduction logic elements perform OR-reduction on the bits in the first half of each of the first two $\frac{1}{2}^i$ of the updated binary number output by the previous stage (i.e. by stage i−1).

The multiplexer 223, 233 receives as inputs the results from the two OR-reduction logic elements in the immediately previous stage and selects one of these two results based on the selected OR-reduction result output from the multiplexer in the immediately previous stage, which is input to the multiplexer 223, 233 in the current stage as a control signal. In particular, if the selected OR-reduction result from the previous stage is a one, then the result from the first OR-reduction logic element in the previous stage is selected and output to the left shifting logic element 222, 232 in the current stage, whereas if the selected OR-reduction result from the previous stage is a zero, then the result from the second OR-reduction logic element in the previous stage is selected and output to the left shifting logic element 222, 232 in the current stage.

Dependent upon the OR-reduction result selected by the multiplexer 223, 233 in the current stage, the left shifting logic element 222, 232 in the current stage shifts the input number by either $n/2^i$ bits or by zero bits, where, as detailed above, i is the stage number, i.e. i=3 for stage 3 and i=4 for stage 4. If the selected OR-reduction result is a zero, the left shifting logic element 222, 232 shifts the data left by $n/2^i$ bits (i.e. the number of bits combined in the OR-reduction operation that generated the selected result) and appends $n/2^i$ zeros and if the selected OR-reduction result is a one, the left shifting logic element 222, 232 shifts the data left by zero bits, i.e. no left shifting is performed.

The current stage outputs an updated binary number from the left shifting logic element 222, 232 (where, as described above, this may be identical to the input number a, in the event that no left shifting was performed in this stage or any of the previous stages), the selected OR-reduction result from the immediately previous stage and the results from the two OR-reduction logic elements in the current stage. The selected OR-reduction result, the results from the two OR-reduction logic elements in the current stage and the updated binary number are input to the next stage and the inverse of the selected OR-reduction result is output as the next most significant bit of the LZC result, s.

The final stage (stage 5, in the example of FIG. 2) comprises a left shifting logic element 242 and a multiplexer 243, but does not comprise any OR-reduction logic elements. The multiplexer 243 receives as inputs the results from the two OR-reduction logic elements in the immediately previous stage and selects one of these two results based on the selected OR-reduction result output from the multiplexer in the immediately previous stage, which is input to the multiplexer 243 in the final stage as a control signal. In particular, if the selected OR-reduction result from the previous stage is a one, then the result from the first OR-reduction logic element in the previous stage is selected and output to the left shifting logic element 242 in the final stage, whereas if the selected OR-reduction result from the previous stage is a zero, then the result from the second OR-reduction logic element in the previous stage is selected and output to the left shifting logic element 242 in the final stage.

Dependent upon the OR-reduction result selected by the multiplexer 243 in the final stage, the left shifting logic element 242 in the final stage shifts the input number by either $n/2^i$ bits or by zero bits, where i is the stage number, i.e. i=5 for stage 5 and for the final stage of any one-stage look ahead normaliser $n/2^i=1$. If the selected OR-reduction result is a zero, the left shifting logic element 242 shifts the data left by one bits (i.e. the number of bits combined in the OR-reduction operation that generated the selected result) and appends a single zero and if the selected OR-reduction result is a one, the left shifting logic element 242 shifts the data left by zero bits, i.e. no left shifting is performed.

The final stage outputs an updated binary number from the left shifting logic element 242 and this is the normalised output, r. In addition, the final stage outputs the inverse of the selected OR-reduction result from the multiplexer 243 in the final stage and this is the final bit, i.e. the LSB, of the LZC result, s.

Whilst the three OR-reduction logic elements 204-208 in the first stage of the normaliser hardware 200 shown in FIG. 2 are shown as separate blocks, some of the logic of the first and second OR-reduction logic elements 204, 206 may be shared since the bits that are reduced by the second OR-reduction logic element 206 (bits n−1:n−n/4) are a subset of those reduced by the first OR-reduction logic element 204 (bits n−1:n/2). This sharing of logic reduces the size of the normaliser hardware.

A second example of the operation of the normaliser hardware 200 shown in FIG. 2 can be described with reference to FIG. 3B. In this example, n=32 and the leading one is in bit 14, as indicated by the asterisk in FIG. 3B (i.e. there are 17 leading zeros in bit positions 31-15). In the first stage, the first OR-reduction logic element 204 performs OR-reduction on the first half of the bits of the input number 322, i.e. bits 31:16. The second and third OR-reduction logic elements 206, 208 perform OR-reduction on the first and third quarters of the bits of the input number 324, 326 respectively, i.e. bits 31:24 and 15:8. If the result of an OR-reduction is a one, this indicates that at least one of the bits that are input to the OR-reduction has a value of one and if the result of the OR-reduction is a zero, this indicates that all the bits that are input to the OR-reduction are zeros. As in this example, the leading one is in bit 14, the output of the first OR-reduction logic element 204 is a zero, the output of the second OR-reduction logic element 206 is also a zero and the output of the third OR-reduction logic element 208 is a one. As a consequence of the zero output by the first OR-reduction logic element 204 in the first stage (the inverse of which is also output as the MSB of the LZC, s), the left shifting logic element 202 in the first stage left shifts the input number a by 16 bits and appends 16 zeros, hence the updated binary number, a', that is output by the first stage comprises only 16 bits from the original input number a (i.e. bits 15:0 from the original input number a) followed by 16 zeros.

Figure 3B:
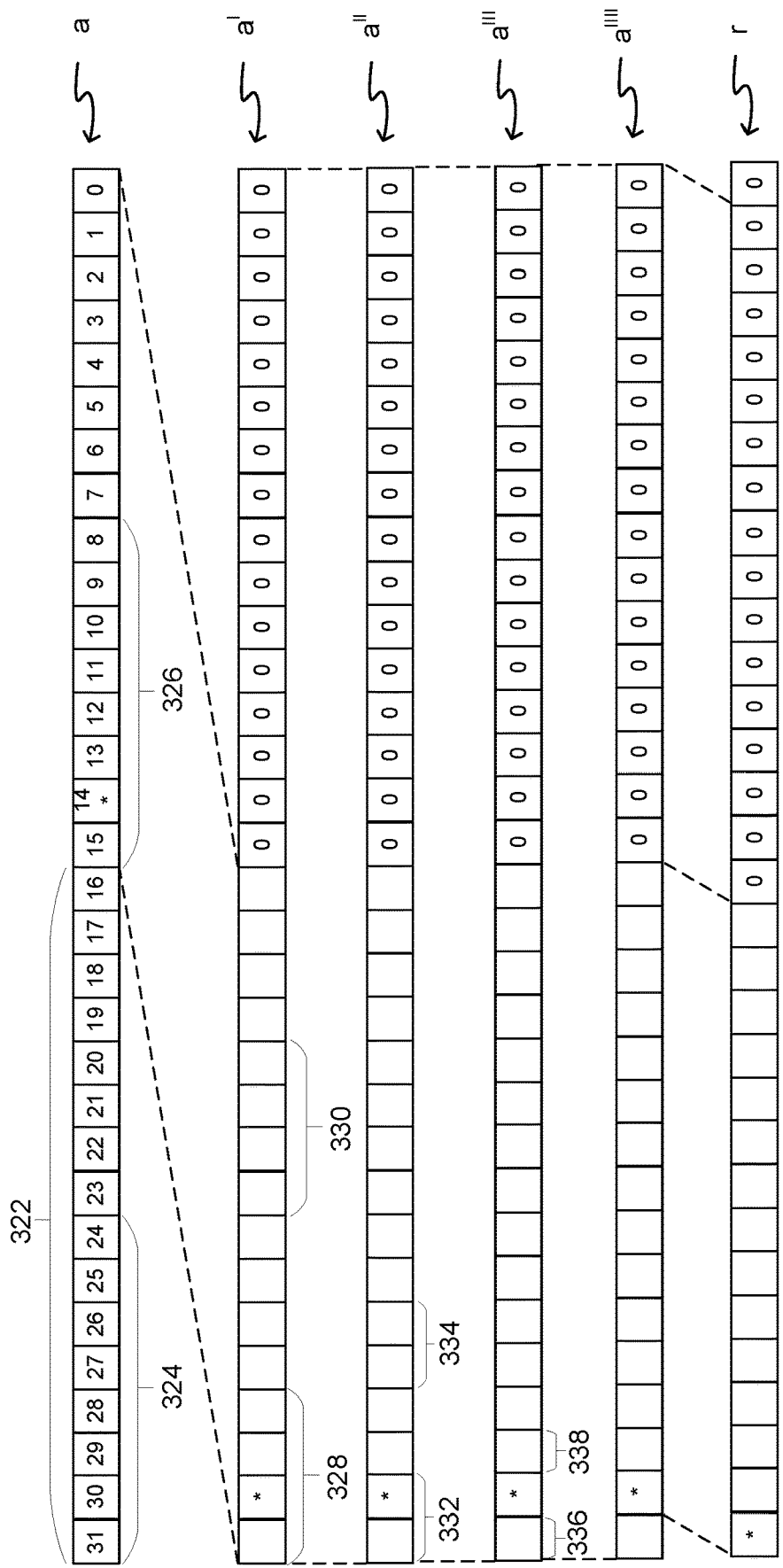

In the second stage of this first example, as shown in FIG. 3, the updated binary number a' that is input comprises 16 bits from the original input number, a (i.e. bits 15:0) followed by sixteen zeros, as shown in FIG. 3B, the two OR-reduction results from the first stage that are input to the multiplexer 213 are zero and one and the OR-reduction result that is used to control the multiplexer is a zero. As a consequence of this zero as a control signal, the second of the two OR-reduction results are selected (i.e. the OR-reduction result corresponding to bits 15:8 from the input number a). As this selected OR-reduction result is a one, no left shifting is performed in the second stage and hence the updated binary number, a'', that is output by the second stage comprises 16 bits from the original input number (i.e. bits 15:0 from the original input number a) followed by 16 zeros and is exactly the same as the number, a', input to the second stage. Additionally, the inverse of the selected OR-reduction result is output as the next most significant bit of the LZC, s, and so now the two MSBs have been determined to be 10 (with the MSB shown on the left).

The first OR-reduction logic element 216 in the second stage performs OR-reduction on bits n−1:n−n/$2^{i+1}$, where in this example i=2 and the bit positions are defined with respect to the updated binary number, a' (and not the original input number, a). Consequently the first OR-reduction logic element 216 in the second stage performs OR-reduction on bits 31:28 of the updated binary number a' (indicated 328 in FIG. 3B). The second OR-reduction logic element 218 in the second stage performs OR-reduction on bits n/$2^i$−1:n−3n/$2^{i+1}$ of the updated binary number, a', input to the second stage. Consequently, the second OR-reduction logic element 218 in the second stage performs OR-reduction on bits 23:20 of the updated binary number a' (indicated bits 330 in FIG. 3B). As in this example, the leading zero is in bit 14 of the original input number, a, which is now bit 30 of the updated binary number a', the output of the first OR-reduction logic element 216 in the second stage is a one and the output of the second OR-reduction logic element 218 may be a zero or a one (dependent upon the values of bits 23:20 of the updated binary number a', which correspond to bits 7:4 of the original input number, a).

In the third stage of this first example, as shown in FIG. 3, the updated binary number a" that is input comprises 16 bits from the original input number, a, the two OR-reduction results that are input to the multiplexer 223 are one and one/zero (depending upon the actual content of the bits that were OR-reduced) and the OR-reduction result that is used to control the multiplexer is a one. As a consequence of this one as a control signal, the first of the two OR-reduction results are selected (i.e. the OR-reduction result corresponding to bits 31:28 of the updated binary number a' which are bits 15:12 from the input number a). As this selected OR-reduction result is a one, no left shifting is performed in the second stage and hence the updated binary number, a''', that is output by the third stage is the same as the binary number, a', input to the second stage. Additionally, the inverse of the selected OR-reduction result is output as the next most significant bit of the LZC, s, and so now the three MSBs have been determined to be 100 (with the MSB shown on the left).

The first OR-reduction logic element 226 in the third stage performs OR-reduction on bits n−1:n−n/$2^{i+1}$, where in this example i=3 and the bit positions are defined with respect to the updated binary number, a" (and not the original input number, a). Consequently the first OR-reduction logic element 216 in the third stage performs OR-reduction on bits 31:30 of the updated binary number a" (indicated 332 in FIG. 3B) The second OR-reduction logic element 228 in the second stage performs OR-reduction on bits n/$2^i$−1:n−3n/$2^{i+1}$ of the updated binary number a", input to the third stage. Consequently, the second OR-reduction logic element 228 in the third stage performs OR-reduction on bits 27:26 of the updated binary number a" (indicated bits 334 in FIG. 3B). As in this example, the leading zero is in bit 14 of the original input number, a, which is now bit 30 of the updated binary number a", the output of the first OR-reduction logic element 226 in the second stage is a one and the output of the second OR-reduction logic element 228 may be a zero or a one (dependent upon the values of bits 27:26 of the updated binary number a", which correspond to bits 11:10 of the original input number, a).

In the fourth stage of this first example, as shown in FIG. 3B, the updated binary number a''' that is input comprises 16 bits from the original input number, a, the two OR-reduction results that are input to the multiplexer 233 are one and one/zero and the OR-reduction result that is used to control the multiplexer is a one. As a consequence of this one as a control signal, the first of the two OR-reduction results are selected (i.e. the OR-reduction result corresponding to bits 31:30 of the updated binary number a" which are bits 15:14 from the input number a). As this selected OR-reduction result is a one, no left shifting is performed in the fourth stage and hence the updated binary number, a'''', that is output by the fourth stage is the same as the binary number a''' input to the fourth stage. Additionally, the inverse of the selected OR-reduction result is output as the next most significant bit of the LZC, s, and so now the four MSBs have been determined to be 1000 (with the MSB shown on the left).

The first OR-reduction logic element 236 in the fourth stage performs OR-reduction on bits n−1:n−n/$2^{i+1}$, where in this example i=4. Consequently the first OR-reduction logic element 236 in the fourth stage performs OR-reduction on bit 31 of the updated binary number a''' (indicated 336 in FIG. 3B). The second OR-reduction logic element 238 in the second stage performs OR-reduction on bits n/$2^i$−1:n−3n/$2^{i+1}$ of the updated binary number, a''', input to the fourth stage. Consequently, the second OR-reduction logic element 238 in the fourth stage performs OR-reduction on bit 29 of the updated binary number a''' (indicated bits 338 in FIG. 3B). As in this example, the leading zero is in bit 14 of the original input number, a, which is now in bit position 30 of the updated binary number a''', the output of the first OR-reduction logic element 236 in the second stage is a zero and the output of the second OR-reduction logic element 238 may be a zero or a one (dependent upon the value of bit 29, which corresponds to bit 12 in the original input number, a).

In the fifth (and final) stage of this first example, as shown in FIG. 3, the updated binary number a'''' that is input comprises 16 bits from the original input number, a, the two OR-reduction results that are input to the multiplexer 243 are zero and one/zero and the OR-reduction result that is used to control the multiplexer is a one. As a consequence of this one as a control signal, the first of the two OR-reduction results are selected (i.e. the OR-reduction result corresponding to bit 31 of the updated binary number a''' which is bit 15 from the input number a). As this selected OR-reduction result is a zero, left shifting by n/$2^i$ bits is performed (i.e. the number of bits combined in the OR-reduction operation that generated the selected result) and for this fifth stage, n/$2^i$=32/32=1 and hence left shifting by one bit is performed. Consequently, the output binary number, r, from the fifth and final stage comprises 15 bits from the original input number, a (i.e. bits 14:0 from the original input number a) and 17 trailing zeros and all the leading zeros have been removed. Additionally, the inverse of the selected OR-reduction result is output as the final (and least significant) bit of the LZC, s, such that s is 10001 (which is 17 in binary).

Figure 4:
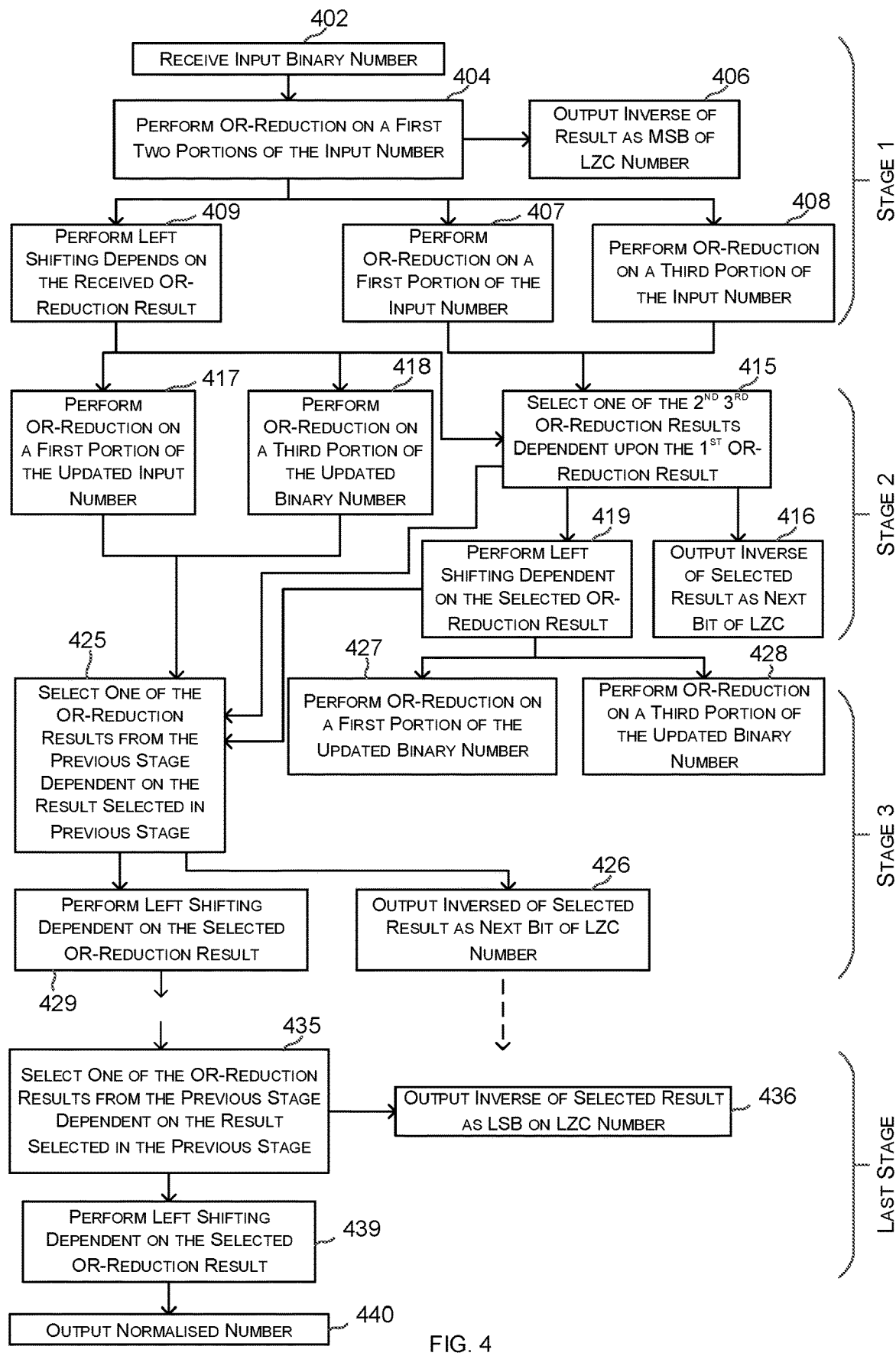
FIG. 4 is a flow diagram showing an example method of operation of the normaliser hardware shown in FIG. 2.

FIG. 4 is a flow diagram showing an example method of operation of the normaliser hardware 200 shown in FIG. 2. As with the hardware 200 of FIG. 2, the method is divided into stages, with each stage of the method being performed by the corresponding hardware stage.

Figure 5:
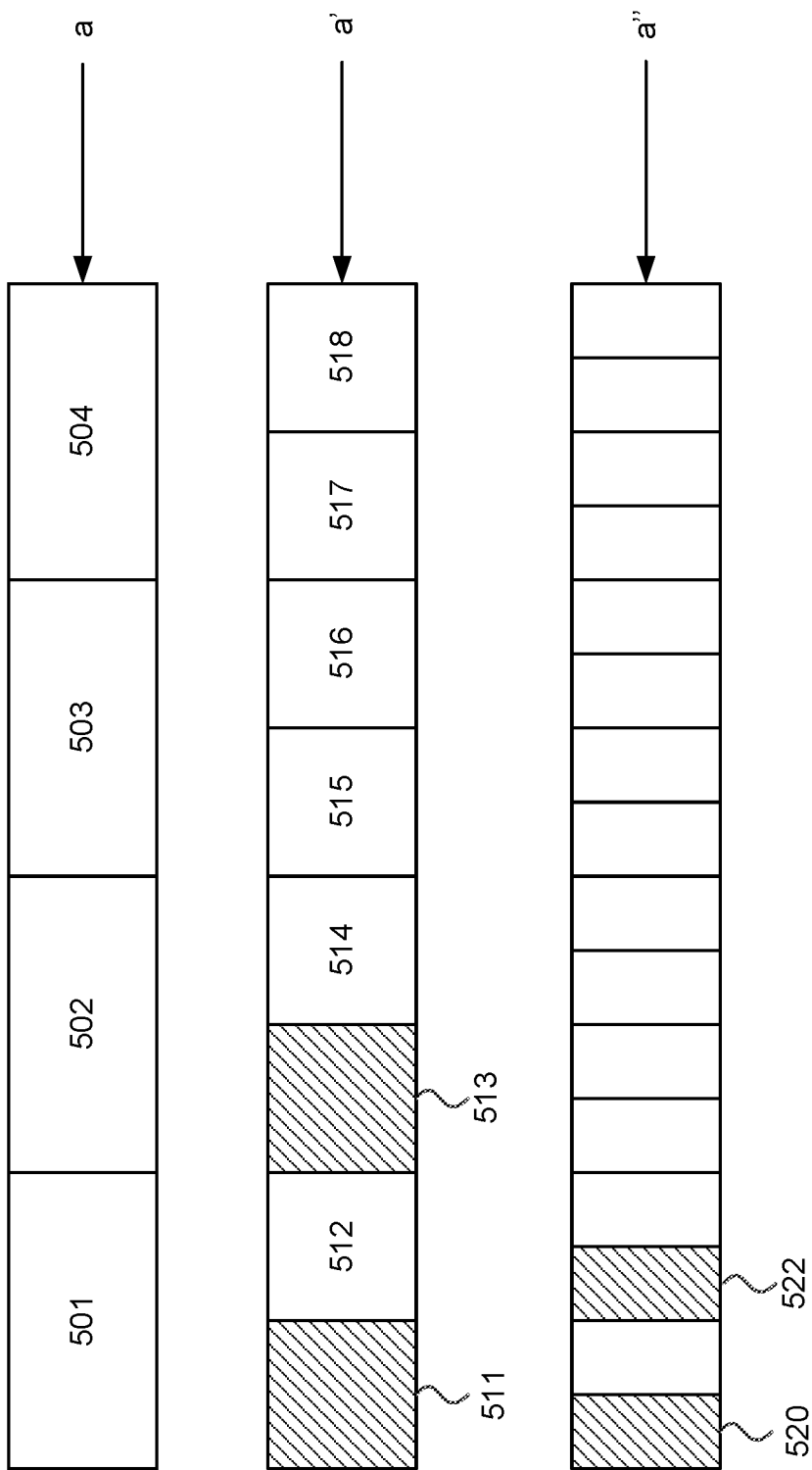
FIG. 5 is a graphical representation of aspects of the method of FIG. 4.

In the first stage of the method, the input binary number is received (block 402) and is logically divided into four portions 501-504, as shown in FIG. 5, and OR-reduction is performed on the first two portions 501-502 (block 404), where the first portion 501 comprises the MSB of the input binary number and the fourth portion 504 comprises the LSB of the input binary number. The inverse of the result of this OR-reduction (on the first two portions 501-502) is output as the MSB of the LZC number (block 406). Two further OR-reduction operations are performed on the first and third portions 501, 503 (blocks 407, 408). In many examples, such as those described above with reference to FIGS. 3A and 3B, the input binary number, a, is divided into four equal portions; however, in other examples, the division may be performed in another way (e.g. such that not all portions comprise the same number of bits).

As well as performing OR-reduction (in blocks 404, 407, 408), the first stage of the method also comprises left shifting the input binary number, a, dependent upon the result of the first OR-reduction operation (block 409). As described above, if the result of the first OR-reduction (as performed in block 404) is a one, no left shifting is performed (in block 409) but if the result of the first OR-reduction is a zero, the method left shifts the input binary number by the number of bits as there are in the first and second portions (in block 409) and then appends trailing zeros to the end of the left shifted number so that the resultant binary number comprises the same number of bits as the input binary number. The output from the left shifting operation may be referred to as an updated binary number and this is input to the next stage of the method along with the three OR-reduction results.

In the second stage of the method, the updated binary number a' is received and is logically divided into eight portions 511-518, where the first and second portions 511-512 comprise the same number of bits as in the first portion 501 in the first stage, the third and fourth portions 513-514 comprise the same number of bits as in the second portion 502 in the first stage, the fifth and sixth portions 515-516 comprise the same number of bits as in the third portion 503 in the first stage and the seventh and eighth portions 517-518 comprise the same number of bits as the fourth portion 504 in the first stage. four, forming four portions 512-518 where these portions are split at the same bit positions as the first and second portions of the first stage and the first and second parts of each of those portions in the first stage. OR-reduction is then performed on a first part 520,522 of each of the first and second portions 512, 514 of the updated binary number (blocks 417-418).

As well as performing OR-reduction (in blocks 417, 418), the second stage of the method also comprises selecting one of the second and third OR-reduction results output by the first stage of the method (block 415) and then left shifting the updated binary number a' dependent upon the selected OR-reduction result (block 419). As described above, if the selected OR-reduction result is a one, no left shifting is performed (in block 419) but if the selected OR-reduction result is a zero, the method left shifts the updated binary number by the same number of bits as were combined in the particular OR-reduction operation to generate the selected result (i.e. by the same number of bits as in the first or third portions of the input binary number, dependent upon which OR-reduction result was selected) and then appends trailing zeros to the end of the left shifted number so that the resultant binary number comprises the same number of bits as the input binary number. The output from the left shifting operation may also be referred to as an updated binary number and this is input to the next stage of the method along with the two OR-reduction results generated in the second stage of the method and the OR-reduction result selected by the multiplexer in the second stage. The second stage of the method additionally comprises outputting the inverse of the selected OR-reduction result (from block 415) as the next most significant bit of the LZC number (block 416).

In the third stage of the method and all subsequent stages except for the final stage, an updated binary number is received from the immediately previous stage of the method, the updated binary number is logically divided into a plurality of portions and OR-reduction is performed on first and third portions of the updated binary number respectively (blocks 427-428). The number of portions into which the updated binary number is divided is dependent upon the stage of the method and the number of portions is given by $2^{i+1}$, where i is the number of the stage (as above). The term 'logical division' is used because there is no actual division of the binary number input to the stage, but this is just a concept used to describe which bits of the input number are input to the OR-reduction operations performed within the stage. As described above, the first and second portions of the updated binary number in one stage (e.g. stage i) together comprise the same number of bits as the first portion in the previous stage (e.g. stage i−1), similarly the third and fourth portions of the updated binary number in one stage (e.g. stage i) together comprise the same number of bits as the second portion in the previous stage (e.g. stage i−1), etc. For the third stage, the updated binary number, a", is logically divided into sixteen portions and OR-reduction is performed on the first and third of these sixteen portions 520, 522.

As well as performing OR-reduction (in blocks 427, 428), the third or subsequent (but not final) stage of the method also comprises selecting one of the first and second OR-reduction results output by the immediately previous stage of the method (block 425) and then left shifting the updated binary number dependent upon the selected OR-reduction result (block 429). As described above, if the selected OR-reduction result is a one, no left shifting is performed (in block 429) but if the selected OR-reduction result is a zero, the method left shifts the updated binary number by the same number of bits as were combined in the particular OR-reduction operation to generate the selected result (i.e. by the same number of bits as in the first or third portions of the updated binary number input to the previous method stage, dependent upon which OR-reduction result was selected) and then appends trailing zeros to the end of the left shifted number so that the resultant binary number comprises the same number of bits as the input binary number. The output from the left shifting operation may also be referred to as an updated binary number and this is input to the next stage of the method along with the two OR-reduction results generated in this particular stage of the method. The third or subsequent stage of the method additionally comprises outputting the inverse of the selected OR-reduction result (from block 425) as a next most significant bit of the LZC number (block 426).

The final stage of the method receives an updated binary number and two OR-reduction results from the immediately previous stage of the method but does not perform any OR-reduction. This final stage of the method comprises selecting one of the first and second OR-reduction results output by the immediately previous stage of the method (block 435) and then left shifting the updated binary number dependent upon the selected OR-reduction result (block 439). As described above, if the selected OR-reduction result is a one, no left shifting is performed (in block 439) but if the selected OR-reduction result is a zero, the method left shifts the updated binary number by a single bit and appends a zero as the LSB, so that the resultant binary number comprises the same number of bits as the input binary number. The output from this final left shifting operation (in block 439) is the normalised number, r, and this is output (block 440). Also output from the final stage is the inverse of the selected OR-reduction result (from block 435) and this is the LSB of the LZC number (block 426).

The examples described above with reference to FIGS. 2-5 relate to a one-stage look ahead normaliser. As described above, the same principles may instead be applied in a two-stage look ahead normaliser or an M-stage look ahead normaliser.

In a two-stage look ahead normaliser, the hardware arrangement is a variation on that shown in FIG. 2 and this can be described with reference to FIG. 6. Its method of operation is a variation on that shown in FIG. 4 and described above. In this two-stage look ahead normaliser 600, the first stage of the normalisation hardware may perform seven separate OR-reduction operations, one on each of seven different subsets of the input number in seven OR-reduction logic elements 204-208, 604-607. The input binary number is logically divided into eight portions and first three subsets 302-306 and the first three OR-reduction logic elements 204-208 are exactly the same as described above with reference to FIGS. 2-4, i.e. the first OR-reduction (in logic element 204) is performed on the first four portions 701-704 (as indicated by bracket 302 in FIG. 7), the second OR-reduction (in logic element 206) is performed on the first and second portions 701-702 (as indicated by bracket 304 in FIG. 7) and the third OR-reduction (in logic element 208) is performed on the fifth and sixth portions 705-706 (as indicated by bracket 306 in FIG. 7). The remaining four subsets are the first, third, fifth and seventh portions 701, 703, 705, 707 respectively of the input number. Each of the remaining four OR-reduction logic elements 604-607 perform OR-reduction on one of these four remaining subsets. The first stage also comprises a left shifting logic element 202 which operates as described above with reference to FIG. 2.

The second stage in the two-stage look ahead renormaliser comprises a first multiplexer 213 and a left shifting logic element 212 which both operate as described above with reference to FIG. 2. The second stage additionally comprises a second multiplexer 613 and four OR-reduction logic elements 614-617. The second multiplexer 613, like the first multiplexer 213, is controlled by the result of the first OR-reduction operation (in logic element 204). Depending upon the value of the control signal, the second multiplexer 613 selects one of two pairs of OR-reduction results received from the first stage, with the first pair, corresponding to the first and third portions of the input number (results output by logic elements 604-605), being selected if the control signal is a one and the second pair, corresponding to the fifth and seventh portions of the input number (results output by logic elements 606-607), being selected if the control signal is a zero. As before, the updated binary number input to the second stage is logically divided into a plurality of portions, where for the second stage the plurality of portions comprises 16 portions (or more generally $2^{i+M}$ portions, and in this example i=2 and M=2). The four OR-reduction logic elements 614-617 in the second stage perform OR-reduction on the first, third, fifth and seventh portions 711-717 of the updated binary number respectively.

The third stage in the two-stage look ahead normaliser, like the second stage, comprises four OR-reduction logic elements 624-627 which each perform OR-reduction on a different subset of the bits of the updated binary number a" output by the left shifting logic element 212 in the second stage. These subsets are selected in the same way as those used in the second stage (as described above), i.e. they are the first, third, fifth and seventh portions of the updated binary number a" input to the third stage, however in the third stage the updated binary number is logically divided into 32 portions (i.e. $2^{i+M}$ portions, where i=3 and M=2). The third stage also comprises two multiplexers 623A, 623B. The first multiplexer 623A takes as input the pair of OR-reduction results selected in the previous stage (and output by the second multiplexer 613 in the second stage) and selects one of these based on the selected single OR-reduction result in the second stage (i.e. as output by the multiplexer 213 in the second stage). As before, the result selected by the multiplexer 623A in the third stage is used to determine whether left shifting is performed in the left shifting logic 222 in the third stage (which operates as described above with reference to FIG. 2). The second multiplexer 623B in the third stage selects one of two pairs of OR-reduction results received from the second stage, with the first pair, corresponding to the first and third portions of the updated binary number a' input to the first stage (results output by logic elements 614-615), being selected if the control signal (which is the selected single OR-reduction result output by the first multiplexer 213 in the second stage) is a one and the second pair, corresponding to the fifth and seventh portions of the updated binary number a' (results output by logic elements 616-617), being selected if the control signal is a zero.

If the normalisation hardware 600 comprised more than five stages, then all subsequent stages except the final two stages would operate in a similar manner to the third stage with the differences being the particular subsets upon which OR-reduction is performed (as the number of portions into which the updated binary number is logically divided increases and hence the value of k reduces for each successive stage) and the particular stage from which OR-reduction results are taken as inputs to the multiplexer. In all subsequent stages the first multiplexer in the stage takes as inputs, a pair of OR-reduction results generated two stages prior to the particular stage (i.e. from the stage before the immediately previous stage) and selected by the second multiplexer in the immediately previous stage. As before, the control signal input to both the multiplexers (which controls which input or pair of inputs is selected by the multiplexer) is the output from the first multiplexer in the immediately previous stage (i.e. the single OR-reduction result output by one of the multiplexers in the immediately previous stage and not the pair of OR-reduction results output by the other of the multiplexers in the immediately previous stage).

The last two stages in the normalisation hardware 600 do not perform any OR-reduction operations and hence do not comprise any OR-reduction logic elements. The fourth (or penultimate) stage comprises two multiplexers 633A, 633B and a left shifting logic element 232. The first multiplexer 633A selects one of the pair of OR-reduction results generated two stages prior to the particular stage (i.e. from the stage before the immediately previous stage) and selected by the second multiplexer 623B in the immediately previous stage, based on the signal output by the first multiplexer 623A in the immediately previous stage (e.g. the third stage) and uses the selected result to determine whether left shifting is performed in the left shifting logic element 232 (which operates as described above with reference to FIG. 2). The second multiplexer 633B in the fourth stage selects one of two pairs of OR-reduction results received from the third stage, with the first pair, corresponding to the first and third portions of the updated binary number a" input to the second stage (results output by logic elements 624-625), being selected if the control signal (which is the selected single OR-reduction result output by the first multiplexer 633A in the third stage) is a one and the second pair, corresponding to the fifth and seventh portions of the updated binary number a" (results output by logic elements 626-627), being selected if the control signal is a zero.

The final stage comprises one multiplexer 643 and a left shifting logic element 242. The multiplexer selects one of the pair of OR-reduction results generated two stages prior to the particular stage (i.e. from the stage before the immediately previous stage) and selected by the second multiplexer 633B in the immediately previous stage, based on the signal output by the first multiplexer 633A in the immediately previous stage (e.g. the fourth stage) and uses the selected result to determine whether left shifting is performed in the left shifting logic element 242 (which operates as described above with reference to FIG. 2) and the resultant binary number (generated by the left shifting logic element 242) is output as the normalised result.

In this two-stage look ahead normaliser 600, each stage outputs one bit of the LZC result, s, in the same way as described above with reference to FIGS. 2 and 4. In all the examples described herein, exception handling logic may be used to handle an input binary number, a, which comprises only zeros (which may, for example, be detected based on the MSB of the normalised result, r), as the hardware described herein may otherwise return an incorrect LZC result.

Figure 6:
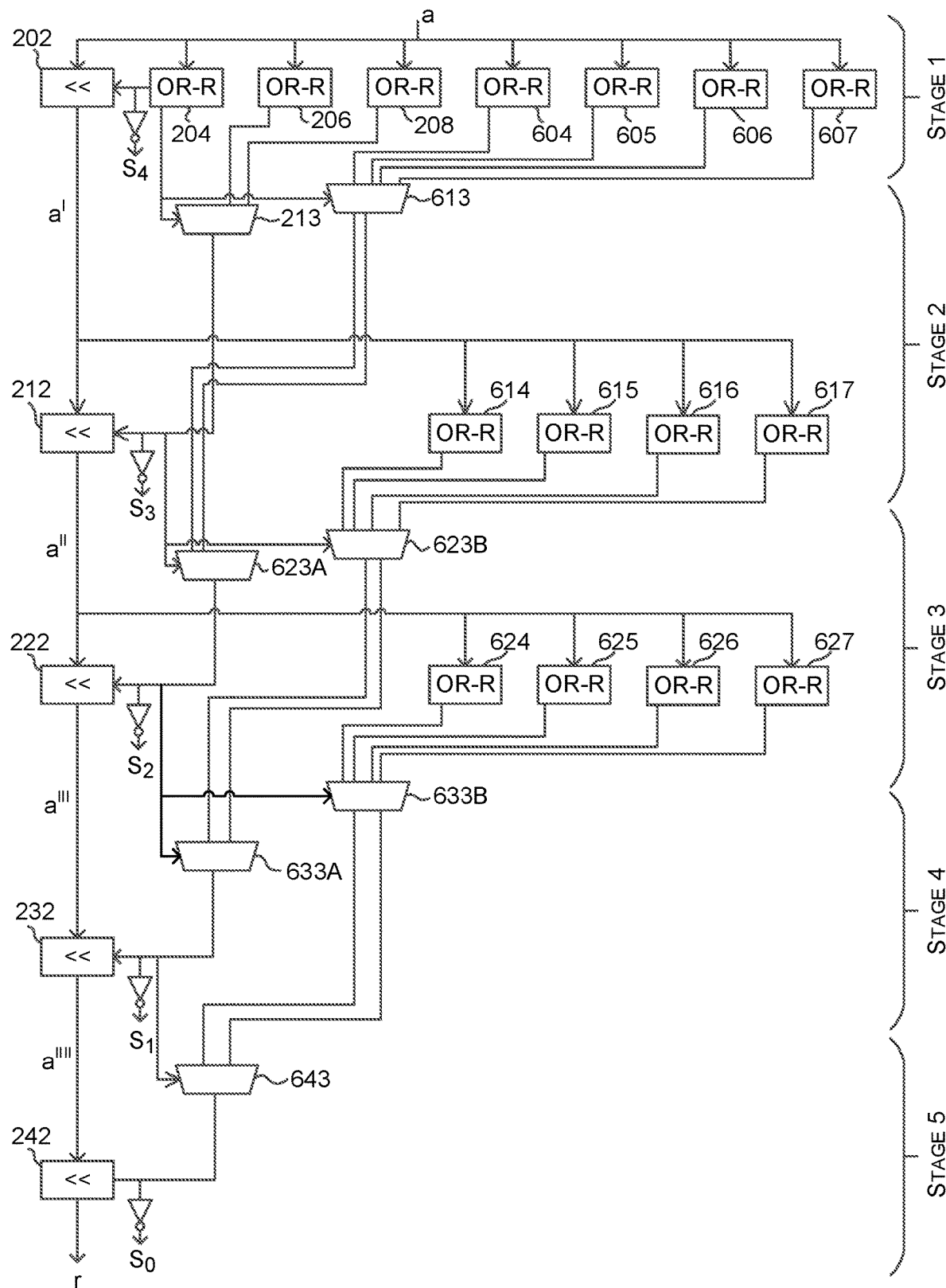
FIG. 6 is a schematic diagram showing an example two-stage look ahead normaliser.
Figure 7:
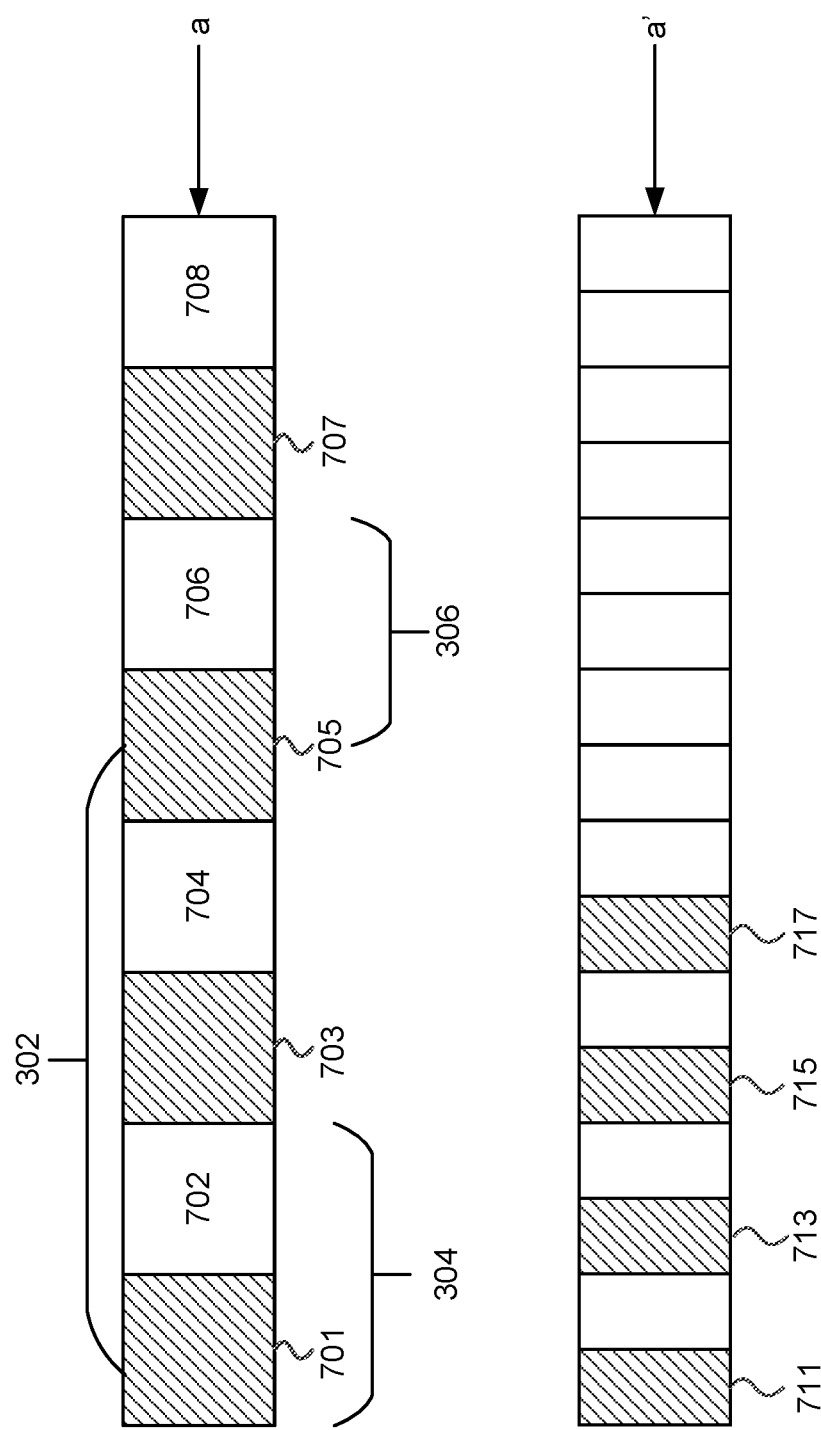
FIG. 7 is a graphical representation of aspects of the operation of the hardware of FIG. 6.

Whilst the seven OR-reduction logic elements 204-208, 604-607 in the first stage of the normaliser hardware 600 shown in FIG. 6 are shown as separate blocks, as described, some of the logic may be share between OR-reduction logic elements where they are operating on the same bits and this overlap of subsets of bits is shown graphically in FIG. 7. In particular and as described above, some of the logic of the first and second OR-reduction logic elements 204, 206 may be shared since the subset of bits 306 that are reduced by the second OR-reduction logic element 206 are a subset of those bits 304 reduced by the first OR-reduction logic element 204. Furthermore, this logic may be further shared with the fourth OR-reduction logic element 604 since that logic element reduces a subset of bits 701 that overlaps with both these other subsets 304, 306. In addition, some of the logic of the third and sixth OR-reduction logic elements 208, 606 may be shared since they operate on overlapping subsets of bits 306, 705. This sharing of logic reduces the size of the normaliser hardware.

In the normaliser hardware described herein, the first stage of the hardware comprises a different combination of logic elements to all the subsequent stages, e.g. it does not comprise a multiplexer and may comprise more OR-reduction logic elements than any single subsequent stage. The one or more final stages of the hardware also comprise a different combination of logic elements to all previous stages, e.g. they do not comprise any OR-reduction logic elements. The other hardware stages, between the first stage and the one or more final stages may be referred to as intermediate stages, and each intermediate stage comprises a plurality of OR-reduction logic elements (where the number of OR-reduction logic elements may be fewer than the first stage), one or more multiplexers and a left shifting logic element. A look ahead normaliser comprises one first stage, one or more intermediate stages and one or more final stages (e.g. M final stages for a M-stage look ahead normaliser). The normalised number is output from the last of the final stages.

As described above, the look ahead normalisers described herein perform additional OR-reduction operations in earlier hardware stages compared to an alternative logarithmic architecture and as a result this reduces the critical path and fan-out load and hence the overall delay of the normalisation operation. This enables smaller hardware to be used to produce a normaliser with a given delay. The methods and hardware described herein provide the advantages of the logarithmic architecture, whilst improving the delay.

Whilst in many of the examples above, n is a power of two and each stage left shifts the bits input to that stage by k bits or zero bits, where k halves in each successive stage, in other examples n may not be a power of two and/or k may reduce by different amounts. In examples where n is not a power of two, the input number, a, may be left aligned to the next power of two (e.g. by adding one or more additional leading zeros) and then modifying the LZC result accordingly (e.g. to decrease the value by the number of additional leading zeros added). Furthermore, whilst in the examples above, the value of k for a particular stage i, denoted $k_i$, is given by: $k_i = n/2^i$, in other examples, the value of k may be defined differently, e.g. $k_i = n/3^i$. However, in examples where n is not a power of two and/or $k_i \neq n/2^i$, each stage of the hardware cannot output a bit of the LZC and instead, the value of the LZC, s, may be calculated from the contributions of the individual stages (e.g. as each may add a particular number of leading zeros to the final count).

In further variations on the methods and hardware described herein, the hardware may be combined with an arbitrary left shifter to save area and/or some stages may be skipped if there is prior knowledge about the number of leading zeros.

There are many applications for the normaliser hardware described herein and examples include conversion of binary numbers between fixed and floating point formats. In such examples, the LZC, s, is used to perform exponent correction and by producing the bits of the LZC one bit at a time, starting with the MSB, this enables the exponent to be progressively corrected in parallel with the calculation of the remaining bits of the LZC. A further application for the normaliser hardware described herein is a floating point average or box filter. The methods and hardware may also be used to generate partially renormalised results (e.g. as output by an intermediate stage) and/or to generate an offset LZC (by first offsetting the input number, a).

Figure 8:
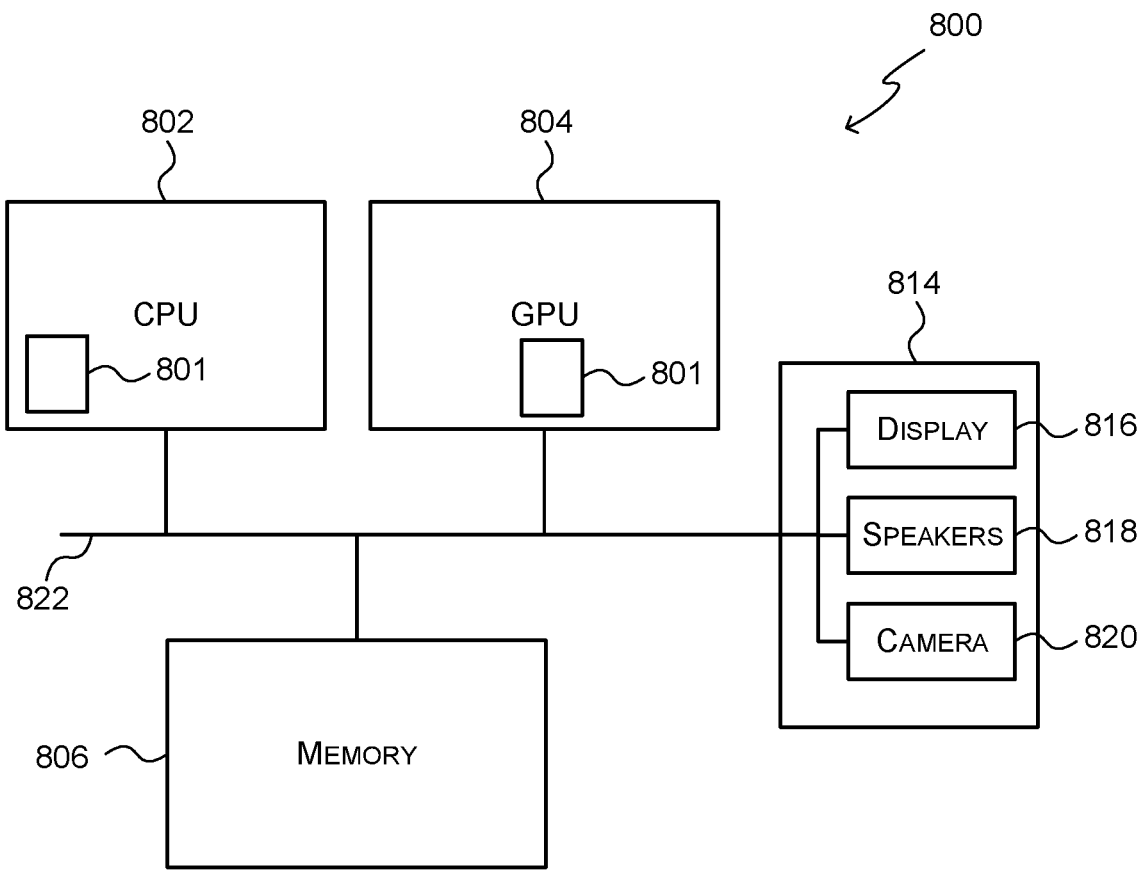
FIG. 8 shows a computer system in which a look ahead normaliser is implemented.

FIG. 8 shows a computer system in which the normalisation hardware described herein may be implemented. The computer system comprises a CPU 802, a GPU 804, a memory 806 and other devices 814, such as a display 816, speakers 818 and a camera 820. The normaliser hardware 801 described herein may be implemented within the CPU 802 and/or GPU 804. The components of the computer system can communicate with each other via a communications bus 822.

The normaliser hardware 200, 600 of FIGS. 2 and 6 are shown as comprising a number of functional blocks. This is schematic only and is not intended to define a strict division between different logic elements of such entities. Each functional block may be provided in any suitable manner. It is to be understood that intermediate values described herein as being formed by a normaliser need not be physically generated by the normaliser at any point and may merely represent logical values which conveniently describe the processing performed by the normaliser between its input and output.

The normaliser hardware described herein may be embodied in hardware on an integrated circuit. The normaliser hardware described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java® or OpenCL®. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), physics processing units (PPUs), radio processing units (RPUs), digital signal processors (DSPs), general purpose processors (e.g. a general purpose GPU), microprocessors, any processing unit which is designed to accelerate tasks outside of a CPU, etc. A computer or computer system may comprise one or more processors. Those skilled in the art will realize that such processing capabilities are incorporated into many different devices and therefore the term 'computer' includes set top boxes, media players, digital radios, PCs, servers, mobile telephones, personal digital assistants and many other devices.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a normaliser configured to perform any of the methods described herein, or to manufacture a normaliser comprising any apparatus described herein. An integrated circuit definition dataset may be, for example, an integrated circuit description.

Therefore, there may be provided a method of manufacturing, at an integrated circuit manufacturing system, a normaliser as described herein. Furthermore, there may be provided an integrated circuit definition dataset that, when processed in an integrated circuit manufacturing system, causes the method of manufacturing a normaliser to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a normaliser will now be described with respect to FIG. 9.

Figure 9:
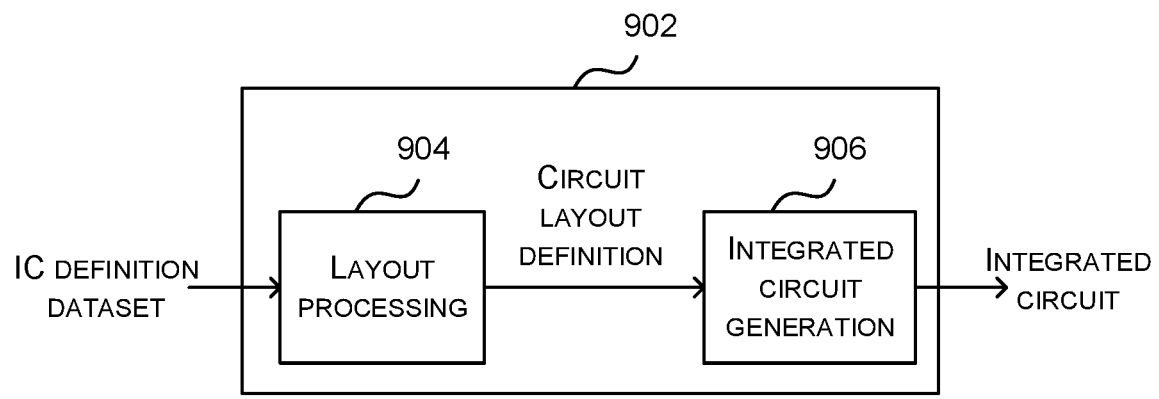
FIG. 9 shows an integrated circuit manufacturing system for generating an integrated circuit embodying a look ahead normaliser.

FIG. 9 shows an example of an integrated circuit (IC) manufacturing system 902 which is configured to manufacture a normaliser as described in any of the examples herein. In particular, the IC manufacturing system 902 comprises a layout processing system 904 and an integrated circuit generation system 906. The IC manufacturing system 902 is configured to receive an IC definition dataset (e.g. defining a normaliser as described in any of the examples herein), process the IC definition dataset, and generate an IC according to the IC definition dataset (e.g. which embodies a normaliser as described in any of the examples herein). The processing of the IC definition dataset configures the IC manufacturing system 902 to manufacture an integrated circuit embodying a normaliser as described in any of the examples herein.

The layout processing system 904 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 904 has determined the circuit layout it may output a circuit layout definition to the IC generation system 906. A circuit layout definition may be, for example, a circuit layout description.

The IC generation system 906 generates an IC according to the circuit layout definition, as is known in the art. For example, the IC generation system 906 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 906 may be in the form of computer-readable code which the IC generation system 906 can use to form a suitable mask for use in generating an IC.

The different processes performed by the IC manufacturing system 902 may be implemented all in one location, e.g. by one party. Alternatively, the IC manufacturing system 902 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a normaliser without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 9 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 9, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function (s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget."

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. An apparatus comprising hardware logic arranged to normalise an n-bit input number, the hardware logic comprising:
   a first hardware logic stage comprising a left shifting logic element and a plurality of OR-reduction logic elements, wherein each OR-reduction logic element is arranged to perform OR-reduction on a different subset of bits from the input number and the left shifting logic element is arranged to perform left shifting on the input number dependent upon a value output by a first of the OR-reduction logic elements and output an updated binary number;
   one or more intermediate hardware logic stages, each comprising a left shifting logic element, a plurality of OR-reduction logic elements and one or more multiplexers, wherein each OR-reduction logic element in an intermediate stage is arranged to perform OR-reduction on a different subset of bits from an updated binary number received from an immediately previous hardware logic stage, a first of the multiplexers is arranged to select one of a plurality of OR-reduction results received from a previous hardware logic stage and the left shifting logic element is arranged to perform left shifting on the updated binary number received from an immediately previous hardware logic stage dependent upon the selected OR-reduction result and output an updated binary number; and
   one or more final hardware logic stages, each comprising a left shifting logic element and one or more multiplexers, wherein a first of the multiplexers is arranged to select one of a plurality of OR-reduction results received from a previous hardware logic stage and the left shifting logic element is arranged to perform left shifting on the updated binary number received from an immediately previous hardware logic stage dependent upon the selected OR-reduction result and output an updated binary number and wherein, for a last of the final hardware logic stages, the updated binary number is the normalised input number.

2. The apparatus according to claim 1, wherein none of the one or more final hardware stages comprise any OR-reduction logic elements.

3. The apparatus according to claim 1, wherein each stage is further arranged to invert the OR-reduction result selected by the first multiplexer in the stage and output the inverted result as a next most significant bit of a leading zero count value, wherein the first hardware logic stage is arranged to output the most significant bit of the leading zero count value.

4. The apparatus according to claim 1, wherein:
   the left shifting logic element in the first stage is arranged to left shift the input number by $k_1$ bits or zero bits dependent upon the value output by the first of the OR-reduction logic elements in the first stage, and wherein $k_1$ is a number of bits reduced by the first of the OR-reduction logic elements in the first stage; and
   the left shifting logic element in an $i^{th}$ stage is arranged to left shift the input number by $k_i$ bits or zero bits dependent upon the OR-reduction result selected by the multiplexer in the $i^{th}$ stage, and wherein $k_i$ is a number of bits reduced by the OR-reduction logic element that generated the selected OR-reduction result and wherein the $i^{th}$ stage is an intermediate or final stage.

5. The apparatus according to claim 1, wherein:
   the first hardware logic stage comprises three OR-reduction logic elements, the first of the OR-reduction logic elements being arranged to perform OR-reduction on bits in a first and second of four portions of the input number, a second of the OR-reduction logic elements being arranged to perform OR-reduction on bits in the first portion of the input number and a third of the OR-reduction logic elements being arranged to perform OR-reduction on bits in the third portion of the input number;
   each intermediate hardware logic stage comprises two OR-reduction logic elements, a first of the OR-reduction logic elements in an intermediate hardware logic stage being arranged to perform OR-reduction on bits in a first of $2^{i+1}$ portions of the updated binary number received from the immediately previous hardware logic stage and a second of the OR-reduction logic elements in an intermediate hardware logic stage being arranged to perform OR-reduction on a third portion of the updated binary number received from the immediately previous hardware logic stage, wherein i is a number of the stage in the apparatus such that for the first hardware stage i=1 and for a first intermediate stage, i=2; and wherein the multiplexer in an intermediate or final hardware logic stage is arranged to select one of a plurality of OR-reduction results received from an immediately previous hardware logic stage.

6. The apparatus according to claim 5, wherein each of the $2^{i+1}$ portions of an updated binary number input to an $i^{th}$ stage comprise an identical number of bits.

7. The apparatus according to claim 5, wherein for an $i^{th}$ hardware logic stage, the first portion of the updated binary number input to that stage comprises bits $$n-1:n-\frac{n}{2^{i+1}}$$

and the third portion of the updated binary number input to that stage comprises bits:

$$n-\frac{n}{2^i}-1:n-\frac{3n}{2^{i+1}}.$$

8. The apparatus according to claim 1, wherein:
the first hardware logic stage comprises seven OR-reduction logic elements, the first of the OR-reduction logic elements being arranged to perform OR-reduction on bits in a first four of eight portions of the input number, a second of the OR-reduction logic elements being arranged to perform OR-reduction on bits in a first two portions of the input number, a third of the OR-reduction logic elements being arranged to perform OR-reduction on fifth and sixth portions of the input number, a fourth of the OR-reduction logic elements being arranged to perform OR-reduction on a first portion of the input number, a fifth of the OR-reduction logic elements being arranged to perform OR-reduction on a third portion of the input number, a sixth of the OR-reduction logic elements being arranged to perform OR-reduction on a fifth portion of the input number and a seventh of the OR-reduction logic elements being arranged to perform OR-reduction on a seventh portion of the input number;
each intermediate hardware logic stage comprises four OR-reduction logic elements, wherein each of the OR-reduction logic elements in an intermediate hardware logic stage is arranged to perform OR-reduction on bits in a first, third, fifth and seventh of $2^{i+2}$ portions of an updated binary number input to the stage respectively, where i is a number of the stage and for a first intermediate stage, i=2;
a first multiplexer in a first intermediate hardware logic stage is arranged to select one of two OR-reduction results received from the first hardware logic stage, the first of the two OR-reduction results corresponding to the first and second portions of the input number and the second of the two OR-reduction results corresponding to the fifth and sixth portions of the input number;
a second multiplexer in a first intermediate hardware logic stage is arranged to select one of two pairs of OR-reduction results received from the first hardware logic stage, the first pair of the two pairs OR-reduction results corresponding to the first and third portions of the input number and the second pair of the two pairs of OR-reduction results corresponding to the fifth and seventh portions of the input number; and
the multiplexers in any subsequent intermediate hardware logic stages or final hardware logic stages are arranged to select one of a plurality of OR-reduction results received from a hardware logic stage before the immediately previous hardware logic stage.

9. A method of normalising an n-bit input number, the method comprising:
in a first hardware logic stage:
in a plurality of OR-reducing operations, performing OR-reduction on a different subset of bits from the input number with a plurality of OR-reduction logic elements;
left shifting the input number with a left shifting logic element dependent upon a value output by a first of the OR-reducing operations to generate an updated binary number; and
outputting the updated binary number to a next hardware logic stage;
in one or more intermediate hardware logic stages:
in a plurality of OR-reducing operations, performing OR-reduction on a different subset of bits from the updated binary number received from an immediately previous hardware logic stage with a plurality of OR-reduction logic elements;
selecting one of a plurality of OR-reduction results received from a previous hardware logic stage with one or more multiplexers;
left shifting the updated binary number received from an immediately previous hardware logic stage dependent upon the selected OR-reduction result with a left shifting logic element to generate an updated binary number; and
outputting the updated binary number to a next hardware logic stage; and
in one or more final hardware logic stages:
selecting one of a plurality of OR-reduction results received from a previous hardware logic stage with one or more multiplexers;
left shifting the updated binary number received from an immediately previous hardware logic stage dependent upon the selected OR-reduction result with a left shifting logic element to generate an updated binary number; and
outputting the updated binary number,
wherein, for a last of the final hardware logic stages, the updated binary number output by the hardware logic stage is the normalised input number.

10. The method according to claim 9, further comprising:
in the first hardware logic stage, inverting the value output by the first of the OR-reducing operations and outputting the inverted value as a most significant bit of a leading zero count; and
in each subsequent hardware logic stage, inverting the selected one of the plurality of OR-reduction results received from a previous hardware logic stage and outputting the inverted value as a next most significant bit of a leading zero count.

11. The method according to claim 9, wherein:
in the $i^{th}$ hardware logic stage, where i=1, the plurality of OR-reduction operations are performed on a combination of a first and a second of $2^{i+1}$ portions of the input number, and on the first and third portions of the input number, and
in the $i^{th}$ hardware logic stage that is not a final hardware logic stage, where i>1, the plurality of OR-reduction operations are performed on the first and third of $2^{i+1}$ portions of the updated binary number input to the hardware logic stage.

12. The method according to claim 11, wherein for an $i^{th}$ hardware logic stage, the first portion of the updated binary number input to that stage comprises bits:

$$n-1 : n - \frac{n}{2^{i+1}}$$

and the third portion of the updated binary number input to that stage comprises bits:

$$n - \frac{n}{2^i} - 1 : n - \frac{3n}{2^{i+1}}.$$

13. The method according to claim 9, wherein:
in the $i^{th}$ hardware logic stage, where i=1, the plurality of OR-reduction operations are performed on a combination of a first four of $2^{i+2}$ portions of the input number, and on the first, third, fifth and seventh portions of the input number, and
in the $i^{th}$ hardware logic stage that is not a final hardware logic stage, where i>1, the plurality of OR-reduction operations are performed on the first, third, fifth and seventh of $2^{i+2}$ portions of the updated binary number input to the hardware logic stage.

14. A non-transitory computer readable storage medium having stored thereon computer readable program code for generating a processor comprising hardware logic arranged to normalise an n-bit input number, the hardware logic comprising:
a first hardware logic stage comprising a left shifting logic element and a plurality of OR-reduction logic elements, wherein each OR-reduction logic element is arranged to perform OR-reduction on a different subset of bits from the input number and the left shifting logic element is arranged to perform left shifting on the input number dependent upon a value output by a first of the OR-reduction logic elements and output an updated binary number;
one or more intermediate hardware logic stages, each comprising a left shifting logic element, a plurality of OR-reduction logic elements and one or more multiplexers, wherein each OR-reduction logic element in an intermediate stage is arranged to perform OR-reduction on a different subset of bits from an updated binary number received from an immediately previous hardware logic stage, a first of the multiplexers is arranged to select one of a plurality of OR-reduction results received from a previous hardware logic stage and the left shifting logic element is arranged to perform left shifting on the updated binary number received from an immediately previous hardware logic stage dependent upon the selected OR-reduction result and output an updated binary number; and
one or more final hardware logic stages, each comprising a left shifting logic element and one or more multiplexers, wherein a first of the multiplexers is arranged to select one of a plurality of OR-reduction results received from a previous hardware logic stage and the left shifting logic element is arranged to perform left shifting on the updated binary number received from an immediately previous hardware logic stage dependent upon the selected OR-reduction result and output an updated binary number and wherein, for a last of the final hardware logic stages, the updated binary number is the normalised input number.

\* \* \* \* \*